(12) United States Patent
Yaser et al.

(10) Patent No.: US 11,054,635 B1
(45) Date of Patent: Jul. 6, 2021

(54) SYNCHRONIZATION OF MEMS PROJECTOR SLOW AXIS MIRROR TO INPUT VIDEO FRAME RATE

(71) Applicant: STMicroelectronics LTD, Netanya (IL)

(72) Inventors: Eli Yaser, Tel Aviv (IL); Dadi Sharon, Givat Ada (IL)

(73) Assignee: STMicroelectronics LTD, Netanya (IL)

( * ) Notice: Subject to any disclaimer, the term of this patent is extended or adjusted under 35 U.S.C. 154(b) by 0 days.

(21) Appl. No.: 16/789,725

(22) Filed: Feb. 13, 2020

(51) Int. Cl.
| | |
|---|---|
| *H04N 9/31* | (2006.01) |
| *G02B 26/10* | (2006.01) |
| *G02B 26/08* | (2006.01) |
| *G03B 21/28* | (2006.01) |

(52) U.S. Cl.
CPC ....... *G02B 26/101* (2013.01); *G02B 26/0833* (2013.01); *G03B 21/28* (2013.01); *H04N 9/3135* (2013.01); *H04N 9/3179* (2013.01)

(58) Field of Classification Search
CPC .... G02B 26/101; G02B 26/0833; H04N 9/31; H04N 9/3135; H04N 9/3179
USPC .............................................. 345/8, 750, 744
See application file for complete search history.

(56) References Cited

U.S. PATENT DOCUMENTS

| | | | |
|---|---|---|---|
| 8,248,541 B2 | 8/2012 | Brown et al. | |
| 8,446,342 B2 * | 5/2013 | Champion | G09G 3/025 345/15 |
| 9,122,060 B2 * | 9/2015 | Nozaki | H04N 9/3129 |
| 10,303,044 B2 | 5/2019 | Morarity et al. | |
| 2018/0295331 A1 | 10/2018 | Tardif et al. | |

OTHER PUBLICATIONS

Luo, Jianwen et al: "Design and Fabrication of Configurable Digital Controller Interface for Micro Mirror Projector ASIC," IEEE 2011, pp. 392-395.
Conant, Robert A., et al: "A Raster-Scanning Full-Motion Video Display Using Polysilicon Micromachined Mirrors," BSAC, University of California Berkeley, May 22, 2000, 4 pages.

* cited by examiner

*Primary Examiner* — Trang U Tran
(74) *Attorney, Agent, or Firm* — Crowe & Dunlevy

(57) ABSTRACT

A system includes a mirror controller driving fast and slow axis mirrors of a projector with fast and slow axis drive signals to reflect a collimated light beam in a scan pattern across the target. The scan pattern includes trace lines which cause display of an input video stream on the target, and retrace lines which operate to return the slow axis mirror to a proper location to begin a next frame of the scan pattern. The slow axis drive signal is generated to maintain a number of trace lines in each frame of the scan pattern constant across frames, but the slow axis drive signal is modified to lock a phase and frequency of the displayed video to a phase and frequency of the input video stream by changing a number of retrace lines in each frame of the scan pattern on a frame-by-frame basis by a non-integer number.

6 Claims, 5 Drawing Sheets

SYNCHRONIZATION OF MEMS PROJECTOR SLOW AXIS MIRROR TO INPUT VIDEO FRAME RATE

TECHNICAL FIELD

This application is directed to the field of laser or collimated light projection systems and, in particular, to techniques and hardware for adjusting the movement of the slow axis of a dual axis projection system so that the projected video images on a target will follow the frame rate of the input video stream in frequency and phase.

BACKGROUND

Certain laser scanning projection devices such as wafer defect scanners, laser printers, document scanners, projectors, augmented/mixed/virtual displays, and the like often employ a collimated laser beam (which may be a combined laser beam, such as a RGB+Infrared laser beam, formed from multiple laser beams) that scans across a surface in a straight line path. These devices employ one or more tilting mirrors (e.g., a single uniaxial mirror, two uniaxial mirrors, or a biaxial mirror) to deflect the collimated laser beam to perform the scanning. These tilting mirrors may be, or may include, Micro Electro Mechanical Systems ("MEMS") devices. The actuation of mirrors used in MEMS devices, referred to herein as MEMS mirrors, can be via electromagnetic, electrostatic, piezoelectric, and thermoelectric effects, depending on application.

One type of common MEMS mirror includes a stator and a rotor, with the rotor or structures carried by the rotor being reflective. The stator and/or rotor are driven with a drive signal which results in the rotor oscillating with respect to the stator, thereby changing the angle of reflectance of an incident light beam on the rotor. By oscillating the rotor between two orientations, an opening angle of the mirror is defined, and scanning of the light beam across the surface in a first dimension (e.g., horizontal axis) is accomplished. By utilizing a second mirror that does not oscillate but moves linearly and that receives the laser as reflected by the rotor of the first mirror, scanning of the light beam across the surface in a second dimension (e.g., vertical axis) is accomplished.

By reflecting the incident light beam off the first MEMS mirror scanning in the first dimension, onto the second MEMS mirror scanning in a second dimension, and off the second MEMS mirror onto a target at a sufficient rate (or by reflecting the incident beam off a bi-axial MEMS mirror that scans in both the first and second dimensions onto the target at a sufficient rate), a two dimensional image frame is perceived by a human eye. By successively displaying multiple such image frames at a sufficient rate, a video is perceived by the human eye.

The horizontal axis is typically referred to as the "fast axis" because the movement of the MEMS mirror responsible for scanning the incident light beam along the horizontal axis is moving at a rate greater than the rate at which the MEMS mirror responsible for scanning the incident light beam along the vertical axis (typically referred at as the "slow axis") is moving. The horizontal axis mirror is commonly operated at resonance, while the vertical axis mirror is commonly operated in a linear mode (although resonance is possible in some designs). It should be understood that the orientation can be rotated so that the horizontal axis is the slow axis and the vertical axis is the fast axis.

The light source that generates the light beam reflected by the MEMS mirrors is synchronized to the location of the MEMS mirrors in their respective scan patterns and accordingly modulated so as to display the appropriate color and intensity for that location. The hardware that performs this synchronization and modulation of the light source can be referred to as a projection engine.

It is known that to provide for simple projection engine implementation, the number of projection lines (the number of horizontal lines) per frame is kept constant. However, this implies that that the time to form each frame (the frequency of projection of the frames) is dependent upon the fast axis frequency, which may change with environmental conditions (since the resonance frequency of MEMS mirrors may vary with environmental conditions). This therefore presents a challenge in the synchronization of the source video data with the frequency of projection of the frames, since the frequency of projection of the frames does not remain constant yet the frame rate of the source video data does remain constant.

A sample prior art laser scanning projector 10 that addresses these issues is shown in FIG. 1. Here, a video-in interface 11 receives an incoming video signal (e.g., an MPEG or other form of video stream). As can be seen, a frame buffer 14 is utilized to store multiple sequential frames of the incoming video signal. A frame buffer controller 12 cooperates with the video-in interface and projection engine 13 to maintain a sufficient front-loading of frames in the frame buffer 14 such that the frame rate of the displayed video images is decoupled from the frame rate of the incoming video signal itself. This is accomplished because the frame buffer 14 operates as a FIFO buffer and the projection engine 13 modulates the light source 15 appropriately for the scan pattern of the light from the light source 15 across the target by the motion of the mirrors 17, based upon the output of the frame buffer 14 and not based upon the frames of the video signal as they are received.

One disadvantage of this system is that the frame buffer 14 is expensive, consumes power, and introduces delay into the system (e.g., the video signal does not begin to be displayed until the frame buffer 14 begins to overflow).

Another disadvantage is that the use of the frame buffer yields a continuous phase drift between the input video signal and the video displayed on the target. This phase drift can perhaps be best understood by viewing FIG. 2, which shows the phase mismatch between the input video frames (each frame labeled as Tf Video) and the output video displayed (each frame labeled as Tf Mirror).

Shown in FIGS. 3A-3B is the mechanism by which this phase mismatch occurs. Shown in each figure is a frame. In each frame, the period of the fast axis mirror is shown as Tr, so that the period of the fast axis of the frame of FIG. 3A is Tr1 and the period of the fast axis of the frame of FIG. 3B is Tr2. In each frame, the period of the slow axis mirror is shown as Tf, so that the period of the slow axis of the frame of FIG. 3A is Tf1 and the period of the slow axis of the frame of FIG. 3B is Tf2. Note that the slow axis periods Tf1 and Tf2 are each comprised of N trace lines (lines that form the video content) and M retrace lines or flyback lines (lines that do not display video content, but are used to define a vertical blanking period), and that N and M are equal for both frames, and indeed for all frames. Due to changing environmental conditions, Tr2 is greater than Tr1. Since Tf2 and Tf1 are respectively based on Tr2 and Tr1, this difference in fast axis frame rate Tr2 and Tr2 yields a difference in slow axis frame rate Tf2 and Tf1. It is this change in frame rate that produces the phase mismatch between the input video frames and the output video displayed, shown in FIG. 2.

When used to display a single video image, this phase mismatch is not of great concern. However, when two such projection systems are used in a binocular system (such as a virtual reality or augmented reality headset), this phase mismatch becomes a concern because it means that the two video images displayed by the binocular system will drift in phase from one another. This leads to the frame buffer controller 12 dropping or repeating frames from time to time, which is noticeable to the user. The phase drift may also cause strain to the eyes of the user of the binocular system.

In addition, augmented reality, virtual reality, and mixed reality applications call for a short delay (on the order of 2-3 ms) within the projection system since virtual objects are added to a scene while a user keeps moving his or her head. Current projection systems have a greater delay than this desired short delay. Therefore, even if a monocular system is used instead of a binocular system to avoid phase shift issues, current projection systems are still inadequate.

Therefore, further development in this area is needed.

SUMMARY

In one aspect, a system disclosed herein includes: a mirror controller configured to drive a fast axis mirror and a slow axis mirror of a projector with respective fast axis and slow axis drive signals to reflect an incident collimated light beam in a scan pattern across the target, wherein the scan pattern includes trace lines which in aggregate cause display of an input video stream on the target, wherein the scan pattern also includes retrace lines which operate to return the slow axis mirror to a proper location to begin a next frame of the scan pattern; wherein the mirror controller generates the slow axis drive signal so as to maintain a number of trace lines in each frame of the scan pattern constant across frames; and wherein the mirror controller is further configured to modify the slow axis drive signal so as to lock a phase and frequency of the displayed video to a phase and frequency of the input video stream by changing a number of retrace lines in each frame of the scan pattern on a frame-by-frame basis by a non-integer number.

In another aspect, a system disclosed herein includes: a first phase detector configured to receive an input video stream and output a phase of the input video stream; a fast axis drive generator configured to generate a fast axis drive signal for a fast axis mirror; a slow axis drive generator configured to generate a slow axis drive signal for a slow axis mirror; a second phase detector configured to receive the slow axis drive signal and output a phase of the slow axis drive signal; a phase comparator configured to receive the phase of the input video stream and the phase of the slow axis drive signal and to output a difference between the phase of the input video stream and the phase of the slow axis drive signal; a first control circuit configured to generate a first control signal based upon the difference between the phase of the input video stream and the phase of the slow axis drive signal; a first frequency detector configured to receive the input video stream and to output a frequency of the input video stream, the frequency of the input video stream indicative of a frame rate of the input video stream; a second frequency detector configured to receive the slow axis drive signal and to output a frequency of the slow axis drive signal, the frequency of the slow axis drive signal indicative of a frame rate of a displayed video; a frequency comparator configured to compare the frequency of the input video stream to the frequency of the slow axis drive signal and to output a difference between the frame rate of the input video stream and the frame rate of the displayed video; and a second control circuit configured to generate a second control signal based upon the difference between the frame rate of the input video stream and the frame rate of the displayed video; wherein the fast axis drive generator and slow axis drive generator cooperate to reflect an incident collimated light beam in a scan pattern across a target, wherein the scan pattern includes trace lines which in aggregate cause display of the input video stream on the target, wherein the scan pattern also includes retrace lines which operate to return the slow axis mirror to a proper location to begin a next frame of the scan pattern; and wherein the slow axis drive generator is further configured to modify the slow axis drive signal based upon the first and second control signals so as to substantially match a phase and frequency of the displayed video to a phase and frequency of the input video stream by modifying a number of retrace lines in each frame of the scan pattern on a frame-by-frame basis.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 1:
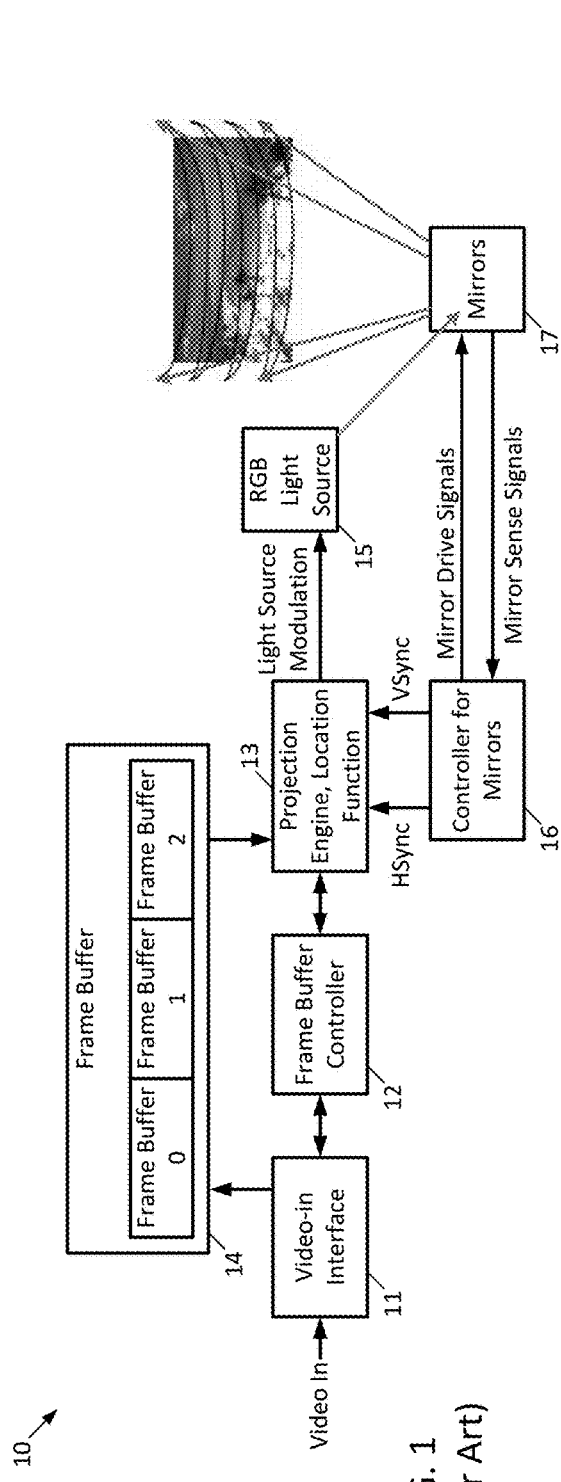
FIG. 1 is a block diagram of a prior art laser projection system utilizing a frame buffer to decouple the frame rate of the input video signal and output video image.
Figure 2:
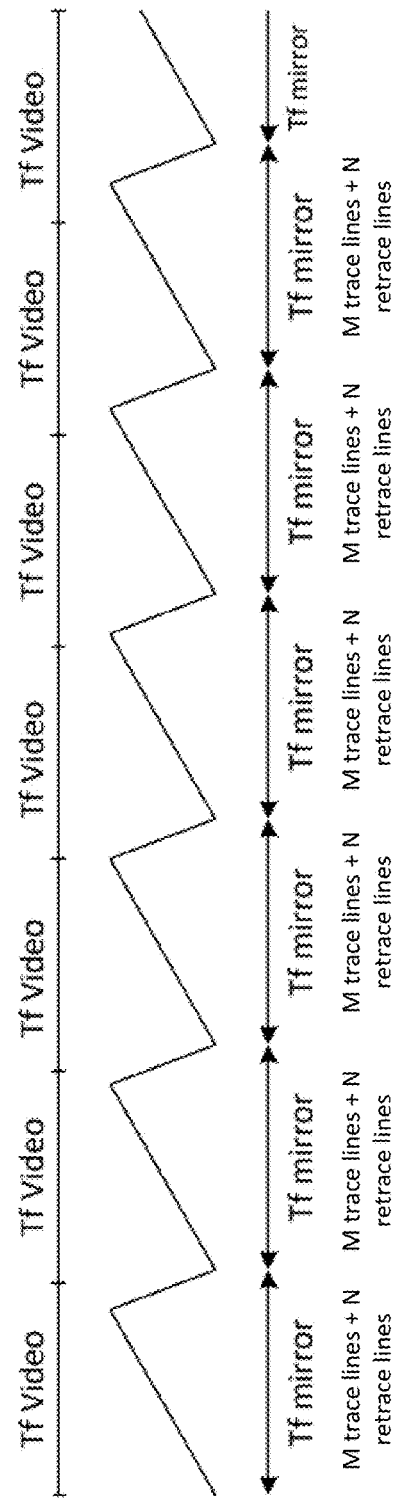
FIG. 2 is a diagram illustrating the drifting phase between the input video signal and output video image that occur using the system of FIG. 1.
Figures 3A, 3B:
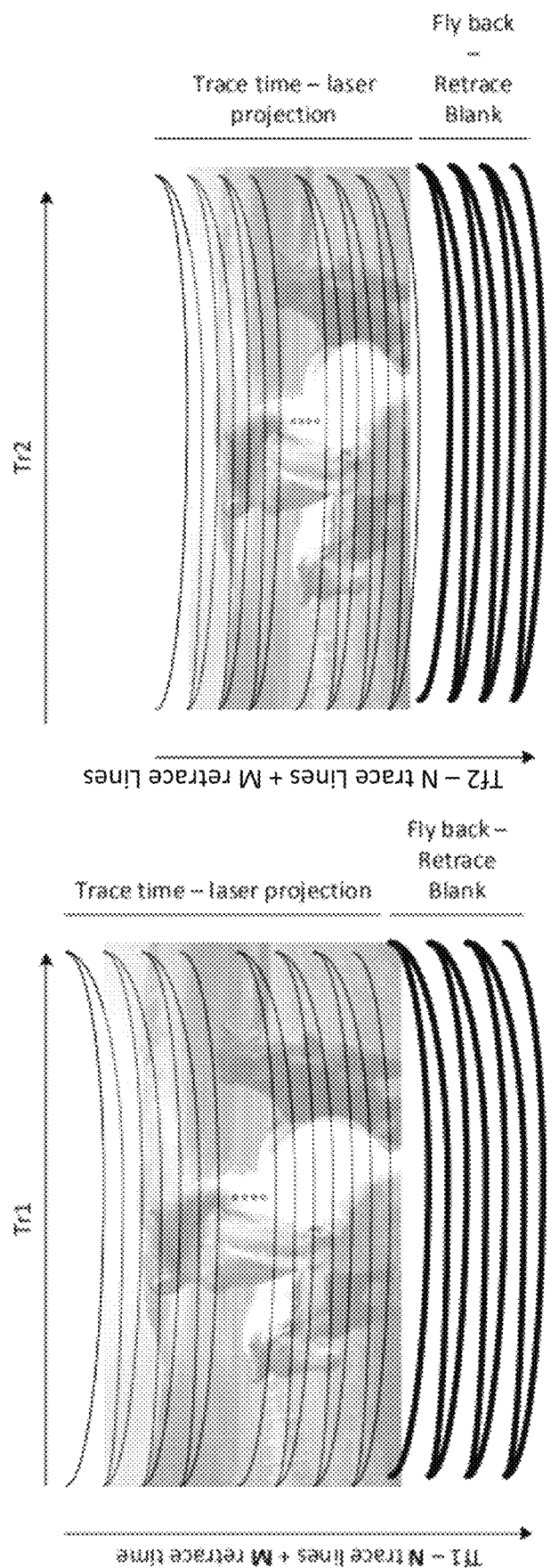
FIGS. 3A-3B are frames showing the mechanism by which the phase drift illustrated in FIG. 2 occurs.
Figure 4:
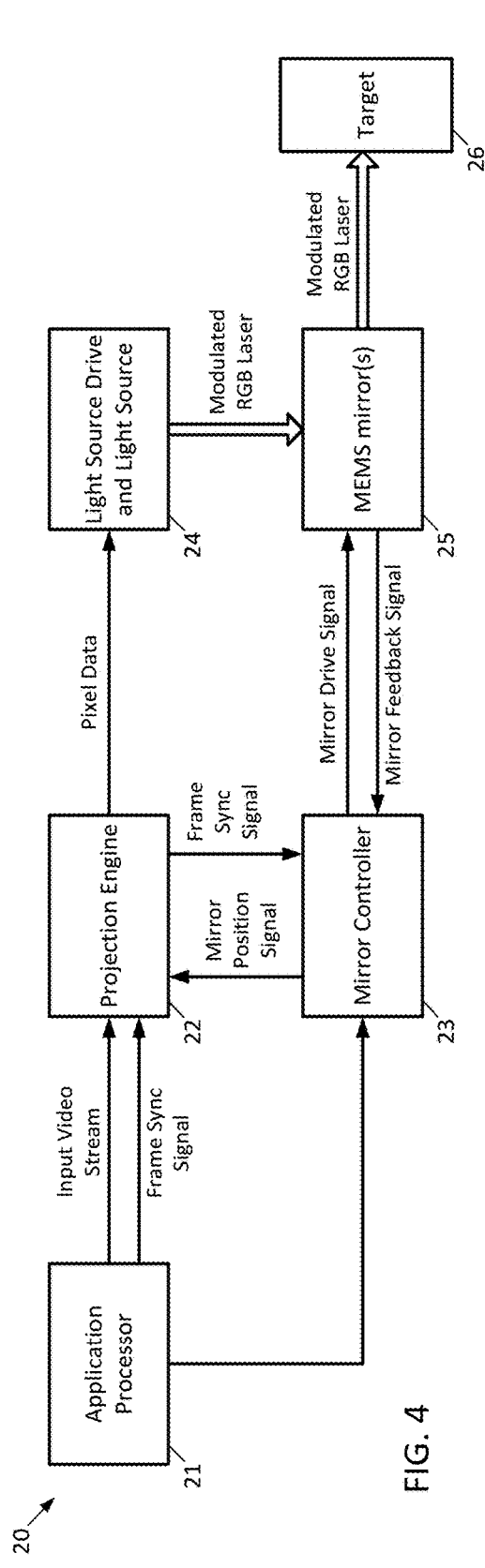
FIG. 4 is a block diagram of a first embodiment of a laser projection system in accordance with this disclosure that adjusts the movement of the slow axis mirror so that the frame rate of the output video images will follow the frame rate of the input video signal in both frequency and phase.

A first embodiment of a laser projection system 20 is shown in FIG. 4. Here, an application processor 21 outputs a video stream to a projection engine 22, and outputs the frame sync signal for the video stream to the projection engine 22, which passes the frame sync signal for the video stream to a mirror controller 23. The mirror controller 23 generates mirror drive signals for MEMS mirrors 25 based upon a mirror feedback signal (mirror sense signal) received from the MEMS mirrors 25, and based upon the frame sync signal; as an alternative, the mirror controller 23 may generate the mirror drive signals for the MEMS mirrors 25 based upon the mirror drive signals and the frame sync signal. The MEMS mirrors 25 reflect a modulated RGB laser emitted by the laser source 24 onto a target 26 to cause display of the video stream. The projection engine 22 determines appropriate pixel data (color and intensity) for the modulated RGB laser emitted by the laser source 24 based upon the video stream and the current position of the RGB laser on the target 26.

The video stream is generated by the application processor 21 with the assumption that the number of scan lines in the display area on the target 26 will remain constant. The mirror controller 23 drives the MEMS mirrors 25 such that the number of fast axis half cycles in the display area is an integer and constant (e.g., such that the number of trace lines do not change). However, the mirror controller 23 detects the phase and frame rate of the video stream from the frame sync signal and detects the phase of the MEMS mirrors 25 (either the fast axis mirror alone, or the slow axis mirror alone, or both the fast axis mirror and the slow axis mirror) from the mirror feedback signals received from the MEMS mirrors 25. Therefore, the mirror controller 23 determines the phase difference between the video stream and one of the MEMS mirrors 25 (such as the slow axis mirror), and alters the number of fast axis half cycles in the blank period (alters the number of flyback or retrace lines) so as to adjust the retrace time. This adjustment may be altering the number of fast axis half cycles (number of flyback or retrace lines) by a non-integer, or by altering the number of fast axis half cycles (number of flyback or retrace lines) by an integer. This permits precise adjustment of the retrace time on a frame-by-frame basis so that a direct correspondence and synchronization between the frame rate and phase of the output video images and frame rate and phase of the video stream is achieved. Note that in some cases, this adjustment may be altering the number of fast axis half cycles (number of flyback or retrace lines) only by a non-integer number and not by an integer number, so that for example, the number of retrace lines is adjusted from 6 to 4.5.

Also note that throughout this, the number of trace lines (number of fast axis half cycles) in the display area remains constant and unchanging. Therefore, stated simply, the mirror controller 24 keeps the number of trace lines constant, while changing the number of retrace lines (such as by a non-integer amount) based upon the above described detected phase mismatch so that a direct correspondence and synchronization between the frame rate and phase of the output video images and frame rate and phase of the video stream is achieved.

Figure 6:
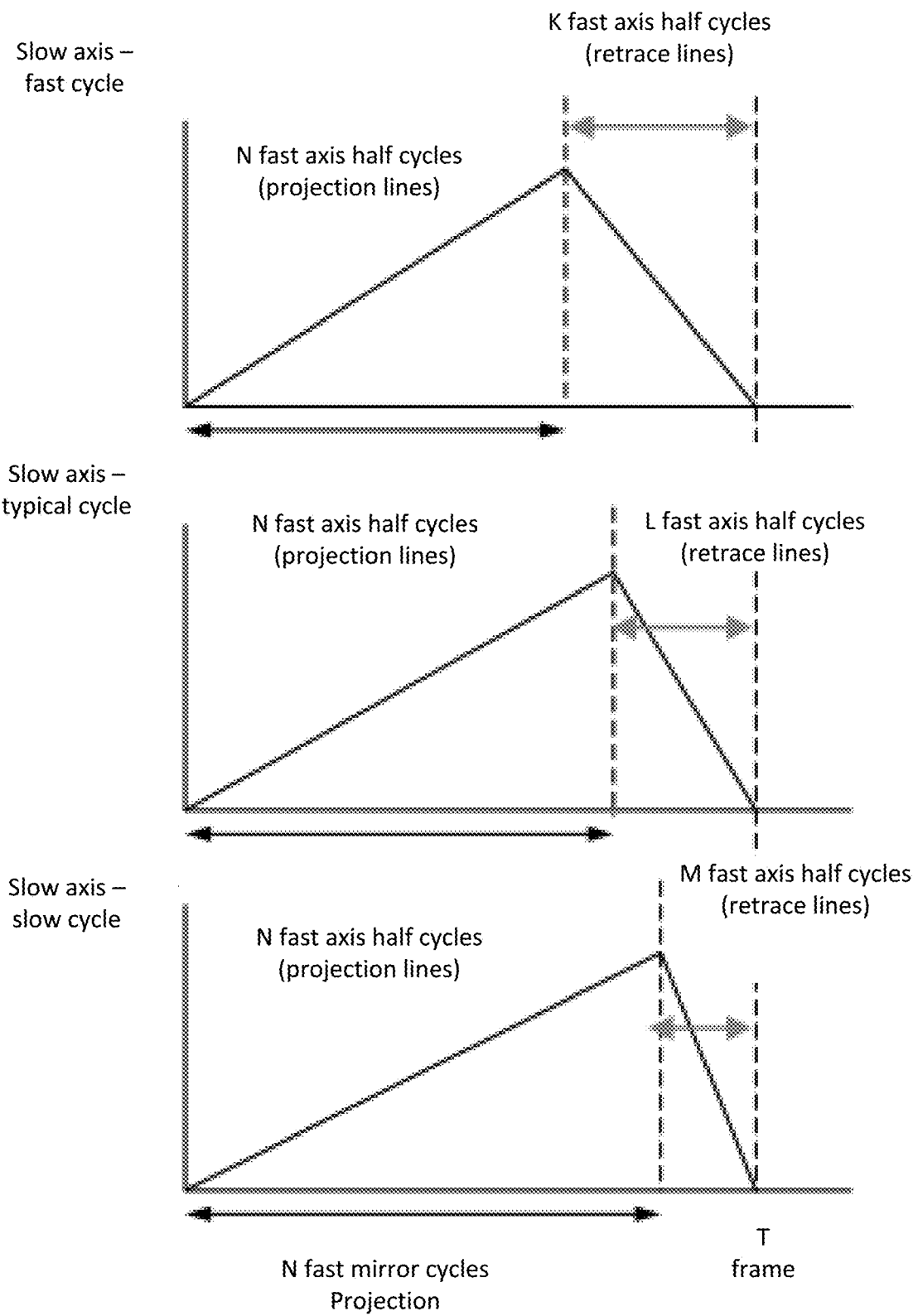
FIG. 6 is a diagram that shows how the embodiments of FIGS. 4-5 adjust the number of retrace lines so as to achieve direct correspondence between the frame rate and phase of the output video images and frame rate and phase of the input video signal.

This can be seen in FIG. 6 which shows slow axis cycle times and number of fast axis half cycles (retrace lines) for three different frames. As can be seen, as the slow axis cycle time increases (decreases in frequency), the number of retrace lines (fast axis half cycles) and therefore the blanking time decreases. Note that in the three shown frames, the number of fast axis trace lines (trace lines) remains constant at N, while the number of retrace lines changes from K to L to M; K, L, and M may differ by non-integer amounts.

Figure 7A:
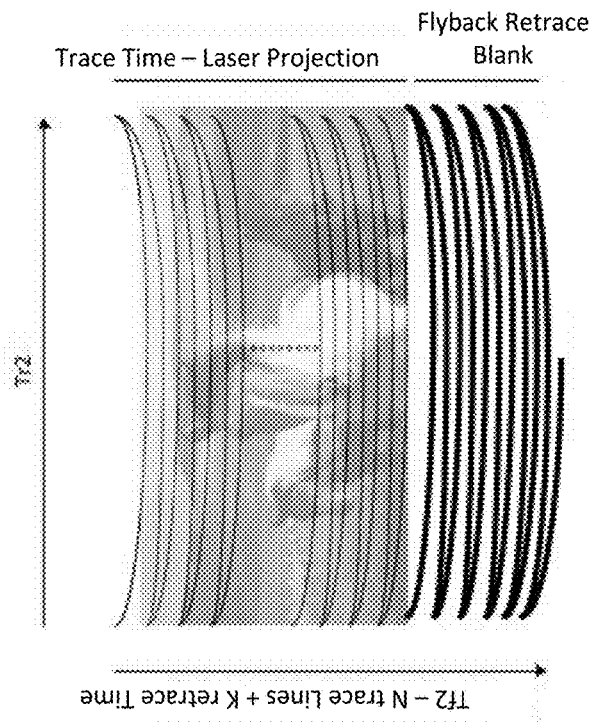
FIGS. 7A-7B are frames showing how direct correspondence between the frame rate and phase of the output video images and frame rate and phase of the input video signal is achieved by adjusting the movement of the slow axis mirror (adjusting the number of retrace lines).
Figure 7B:
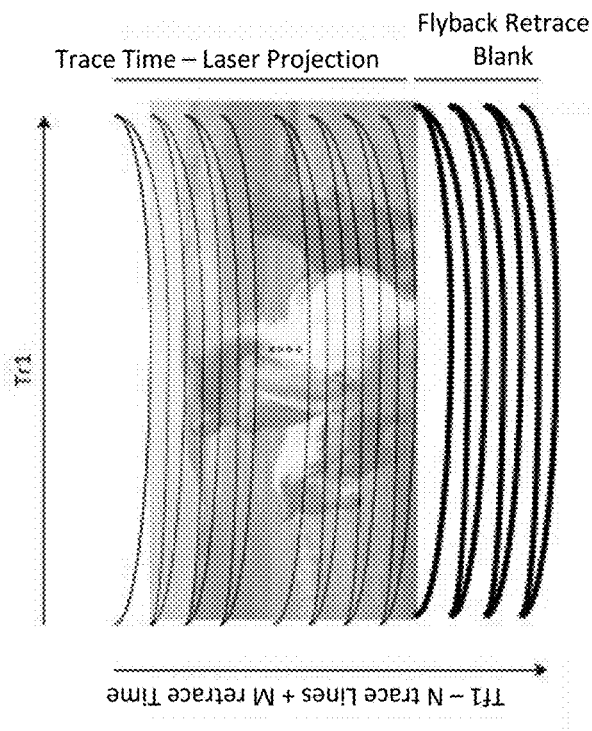

This can also be seen in FIGS. 7A-7B, showing two frames. In each frame, the period of the fast axis mirror is shown as Tr, so that the period of the fast axis of the frame of FIG. 7A is Tr1 and the period of the fast axis of the frame of FIG. 7B is Tr2. In each frame, the period of the slow axis mirror is shown as Tf, so that the period of the slow axis of the frame of FIG. 7A is Tf1 and the period of the slow axis of the frame of FIG. 7B is Tf2. The slow axis periods Tf1 and Tf2 are each comprised of N trace lines (as explained, lines that form the video content) and include respective retrace times of M and K. As can be seen, to keep Tf1 equal to Tf2, the retrace time M of the frame of FIG. 7A is reduced as compared to the retrace time K of FIG. 7B, meaning that the frame of FIG. 7B has more retrace lines than the frame of FIG. 7A, and the difference is a non-integer difference. In particular, the frame of FIG. 7A has 7 retrace lines, while the frame of FIG. 7B has 10.5 retrace lines.

Figure 8:
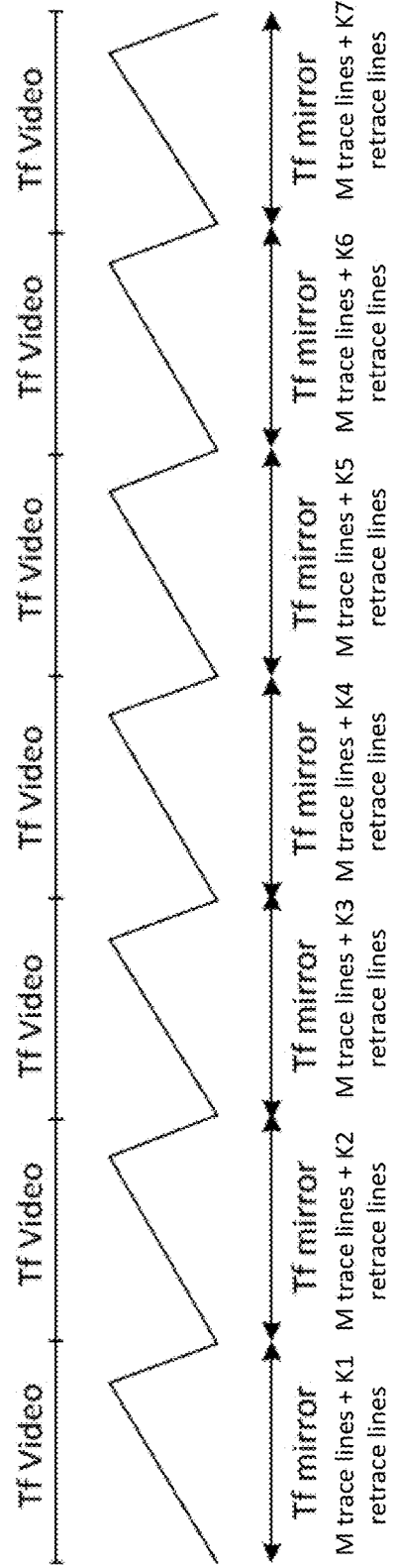
FIG. 8 is a diagram illustrating the lack of phase drift between the input video signal and output video images of the embodiments of FIGS. 4-5.

As shown in FIG. 8, there is no phase mismatch between the input video frames (each frame labeled as Tf Video) and the output video displayed (each frame labeled as Tf Mirror). Note that for each frame, the number of trace lines remains constant at M (meaning each frame has the same number of trace lines), but the number of retrace lines changes, for example with the first frame having K1 retrace lines, the second frame having K2 retrace lines, the third frame having K3 retrace lines, and so on. K1, K2, K3 . . . K7 may differ by non-integer amounts.

It bears repeating that trace lines are those lines used to display video data while retrace lines are those lines that do not display video data and exist to create the blanking time during which the MEMS mirrors 25 return to their starting point to begin display of a new video frame. A line that displays video data is not a retrace line, and a line that does not display video data and does not create the blanking time is not a trace line.

Figure 5:
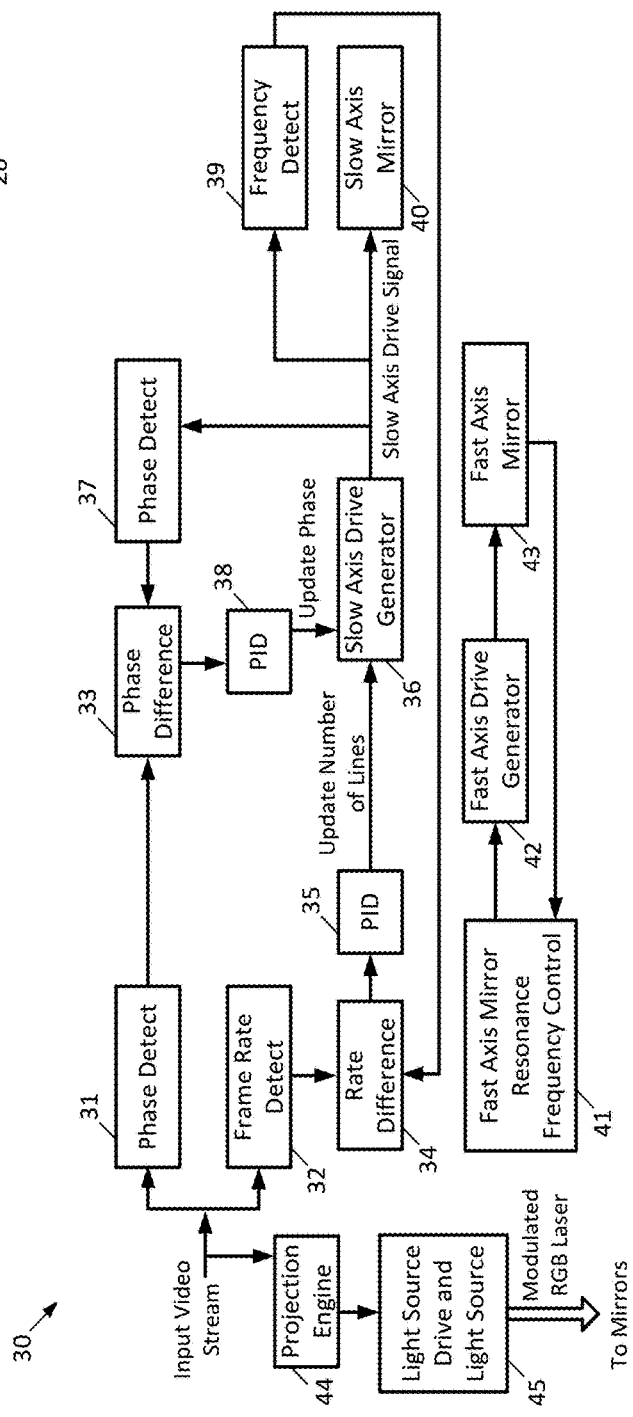
FIG. 5 is a block diagram of a second embodiment of a laser projection system in accordance with this disclosure that adjusts the movement of the slow axis mirror so that the frame rate of the output video images will follow the frame rate of the input video signal in both frequency and phase.

A second embodiment of a laser scanning projector 30 is shown in FIG. 5. The laser scanning projector includes a projection engine 44 that receives an input video stream, and from the input video stream, suitably drives the light source 45 in a modulated fashion so that the light source 45 outputs a RGB laser toward the fast axis 43 and slow axis 40 mirrors that, when scanned in a scan pattern across the target, displays the input video stream.

A phase detector 31 and a frame rate detector 32 both receive the input video stream. The phase detector 31 outputs the phase of the video stream to a phase comparator 33, and the frame rate detector 32 outputs the frame rate of the video stream to a rate comparator 34. A slow axis drive generator 36 generates a slow axis drive signal for the slow axis mirror 40, which is also received by a frequency detector 39 and a phase detector 37. The phase detector 37 receives the slow axis drive signal, and outputs the phase of the slow axis drive signal to the phase comparator 33. The phase comparator 33 outputs the difference between the phase of the video stream and the phase of the slow axis mirror 40 to the PID (proportional-integral-derivative) circuit 38, which provides a control output (shown as "Update Phase" because it is ultimately used to update the phase of the slow axis drive signal) to the slow axis drive generator 36.

The frequency detector 39 outputs the frequency of the slow axis drive signal to the rate comparator 34, which outputs the difference between the frequency (frame rate) of the video stream and the frequency (equivalent to frame rate) of the slow axis mirror 40 to the PID (proportionalintegral-derivative) circuit 35, which provides a control output (shown as "Update Number of Lines" because it is ultimately used to update the number of retrace lines drawn) to the slow axis generator 36. From the two received control outputs, the slow axis generator 36 modifies the slow axis drive signal so as to lock the phase and frequency of the output video images (frame rate) to the frame rate and phase of the input video stream by modifying the number of retrace lines on a frame by frame basis, such as by a non-integer number, while keeping the number of trace lines constant across the various frames of the output video images. Note that the above described phase and frequency detections, and operations of the PID circuits 35 and 38 are performed continuously, or on a frame-by-frame basis.

It can be observed from FIG. 5 that the fast axis mirror 43 is operated in synchronization with the slow axis mirror 40 by separate circuitry. In particular, a fast axis mirror resonance frequency controller 41 outputs a control signal to a fast axis drive generator 42, which generates a drive signal for the fast axis mirror 43. The fast axis mirror 43 outputs a fast axis mirror feedback signal to the fast axis mirror resonance frequency controller 41 as feedback, which the fast axis mirror resonance frequency controller 41 uses to modify the control signal to the fast axis drive generator 42 to lock the frequency of the drive signal for the fast axis mirror 43 to the resonance frequency of the fast axis mirror 43.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A system, comprising:
    a first phase detector configured to receive an input video stream and output a phase of the input video stream;
    a fast axis drive generator configured to generate a fast axis drive signal for a fast axis mirror;
    a slow axis drive generator configured to generate a slow axis drive signal for a slow axis mirror;
    a second phase detector configured to receive the slow axis drive signal and output a phase of the slow axis drive signal;
    a phase comparator configured to receive the phase of the input video stream and the phase of the slow axis drive signal and to output a difference between the phase of the input video stream and the phase of the slow axis drive signal;
    a first control circuit configured to generate a first control signal based upon the difference between the phase of the input video stream and the phase of the slow axis drive signal;
    a first frequency detector configured to receive the input video stream and to output a frequency of the input video stream, the frequency of the input video stream indicative of a frame rate of the input video stream;
    a second frequency detector configured to receive the slow axis drive signal and to output a frequency of the slow axis drive signal, the frequency of the slow axis drive signal indicative of a frame rate of a displayed video;
    a frequency comparator configured to compare the frequency of the input video stream to the frequency of the slow axis drive signal and to output a difference between the frame rate of the input video stream and the frame rate of the displayed video; and
    a second control circuit configured to generate a second control signal based upon the difference between the frame rate of the input video stream and the frame rate of the displayed video;
    wherein the fast axis drive generator and slow axis drive generator cooperate to cause reflection of an incident collimated light beam in a scan pattern across a target, wherein the scan pattern includes trace lines which in aggregate cause display of the input video stream on the target, wherein the scan pattern also includes retrace lines which operate to return the slow axis mirror to a proper location to begin a next frame of the scan pattern; and
    wherein the slow axis drive generator is further configured to modify the slow axis drive signal based upon the first and second control signals so as to substantially match a phase and frequency of the displayed video to a phase and frequency of the input video stream by modifying a number of retrace lines in each frame of the scan pattern on a frame-by-frame basis.

2. The system of claim 1, wherein the slow axis drive generator modifies the slow axis drive signal by modifying a number of retrace lines in each frame of the scan pattern by a non-integer number.

3. The system of claim 1, wherein the slow axis drive generator modifies the slow axis drive signal by modifying a number of retrace lines in each frame of the scan pattern by an integer number.

4. The system of claim 1, further comprising a light source configured to generate the collimated light beam, and a projection engine configured to control the light source to modulate the collimated light beam based upon the input video stream to achieve correspondence with positions of the collimated light beam on the target during the scan pattern and portions of the input video stream.

5. The system of claim 1, wherein the first control circuit comprises a first proportional-integral-derivative controller; and wherein the second control circuit comprises a second proportional-integral-derivate controller.

6. The system of claim 1, wherein the fast axis mirror is a first MEMS mirror driven by the fast axis drive generator at resonance; and wherein the slow axis mirror is a second MEMS driven by the slow axis drive generator in linear mode.

* * * * *